United States Patent
Crasmariu et al.

(10) Patent No.: US 10,924,166 B2
(45) Date of Patent: Feb. 16, 2021

(54) COMPLEXITY REDUCTION FOR TRANSMITTER PRECODING

(71) Applicant: NXP USA, Inc., Austin, TX (US)

(72) Inventors: Victor-Florin Crasmariu, Bucharest (RO); Andrei Alexandru Enescu, Bucharest (RO); Marius Octavian Arvinte, Focsani (RO)

(73) Assignee: NXP USA, INC., Austin, TX (US)

(*) Notice: Subject to any disclaimer, the term of this patent is extended or adjusted under 35 U.S.C. 154(b) by 558 days.

(21) Appl. No.: 15/411,054

(22) Filed: Jan. 20, 2017

(65) Prior Publication Data

US 2018/0115349 A1    Apr. 26, 2018

(30) Foreign Application Priority Data

Oct. 25, 2016    (RO) .............................. A201600754

(51) Int. Cl.
*H04B 7/0456*    (2017.01)

(52) U.S. Cl.
CPC .................................. *H04B 7/0456* (2013.01)

(58) Field of Classification Search
CPC .............................. H04B 7/0456; H04B 7/06
USPC .................... 375/295, 260, 267, 219
See application file for complete search history.

(56) References Cited

U.S. PATENT DOCUMENTS

| | | | | |
|---|---|---|---|---|
| 2006/0039489 A1* | 2/2006 | Ikram | ................. | H04L 25/0248 375/260 |
| 2009/0323849 A1* | 12/2009 | Bala | ................. | H04L 25/03343 375/267 |
| 2010/0310000 A1* | 12/2010 | Ko | ....................... | H04B 7/0639 375/260 |
| 2011/0003608 A1* | 1/2011 | Forenza | ................. | H04B 7/024 455/501 |
| 2014/0146862 A1 | 5/2014 | Aubert | | |

OTHER PUBLICATIONS

Hammarling, et al., "Updating the QR factorization and the least squares problem", Manchester Institute for Mathematical Sciences School of Mathematics, Nov. 2008, 73 pages.

\* cited by examiner

*Primary Examiner* — Wednel Cadeau

(57) ABSTRACT

A transmitter includes a plurality of user-specific channels, with each user specific channel associated with a different set of user equipment (UE) receive antennas. For precoding, the transmitter generates a baseline channel matrix reflecting the characteristics of the communication medium employed to transmit data to the different user equipment (UEs). For each user-specific channel, the transmitter generates a complementary channel matrix based on the baseline channel matrix, then performs matrix decomposition to eliminate selected terms of the complementary channel matrix that interfere from other communication channels of the transmitter. The transmitter can reuse portions of one rotational matrix set generated for one channel to generate the rotational matrix sets for one or more other channels.

20 Claims, 5 Drawing Sheets

US 10,924,166 B2

1

COMPLEXITY REDUCTION FOR TRANSMITTER PRECODING

BACKGROUND

Field of the Disclosure

The present disclosure relates generally to data communication and more particularly relates to data transmitters.

Description of the Related Art

Communication networks typically employ transmitters to communicate information to endpoints of the network. For example, cellular networks employ base stations to communicate data from the network infrastructure to user equipment (e.g., mobile handsets). To facilitate more reliable and efficient communication, the base stations sometimes use multiple-input multiple-output (MIMO) transmitters to take advantage of communication features such as multipath propagation. The MIMO transmitter includes multiple communication channels, with each channel transmitting data to a corresponding user equipment. To reduce the communication overhead at the user equipment, the MIMO transmitter typically precodes data prior to transmission via a communication channel. In particular, precoding can adjust the data to be transmitted in order to account for interference from data being concurrently communicated via other channels of the MIMO transmitter. However, conventional precoding typically demands generation of multiple complex matrices to generate a null space used to adjust the data to be transmitted, negatively impacting the processing efficiency and power consumption of the MIMO transmitter.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-5 illustrate techniques for reusing portions of precoding matrix sets for different communication channels of a transmitter, such as a multi-user (MU) MIMO transmitter of a cellular communications network. The transmitter includes a plurality of user-specific channels, with each user specific channel associated with a different set of user equipment (UE) receive antennas. For precoding, the transmitter generates a baseline channel matrix reflecting the characteristics of the communication medium employed to transmit data to the different user equipment (UEs). For each user-specific channel, the transmitter generates a complementary channel matrix based on the baseline channel matrix, then performs matrix decomposition (e.g., QR-Givens decomposition) to eliminate selected terms of the complementary channel matrix that interfere from other communication channels of the transmitter. To perform the matrix decomposition, the transmitter generates a set of rotational matrices, then multiplies each rotational matrix in the set to the complementary channel matrix. However, for user-specific channels of the transmitter that are in relatively close proximity to each other in a channel order, the sets of rotational matrices are relatively similar, differing by only a subset of matrices. Accordingly, the transmitter can reuse portions of one rotational matrix set generated for one channel to generate the rotational matrix sets for one or more other channels. This reduces the overall computational load at the transmitter for precoding, conserving power and improving communication efficiency.

Figure 1:
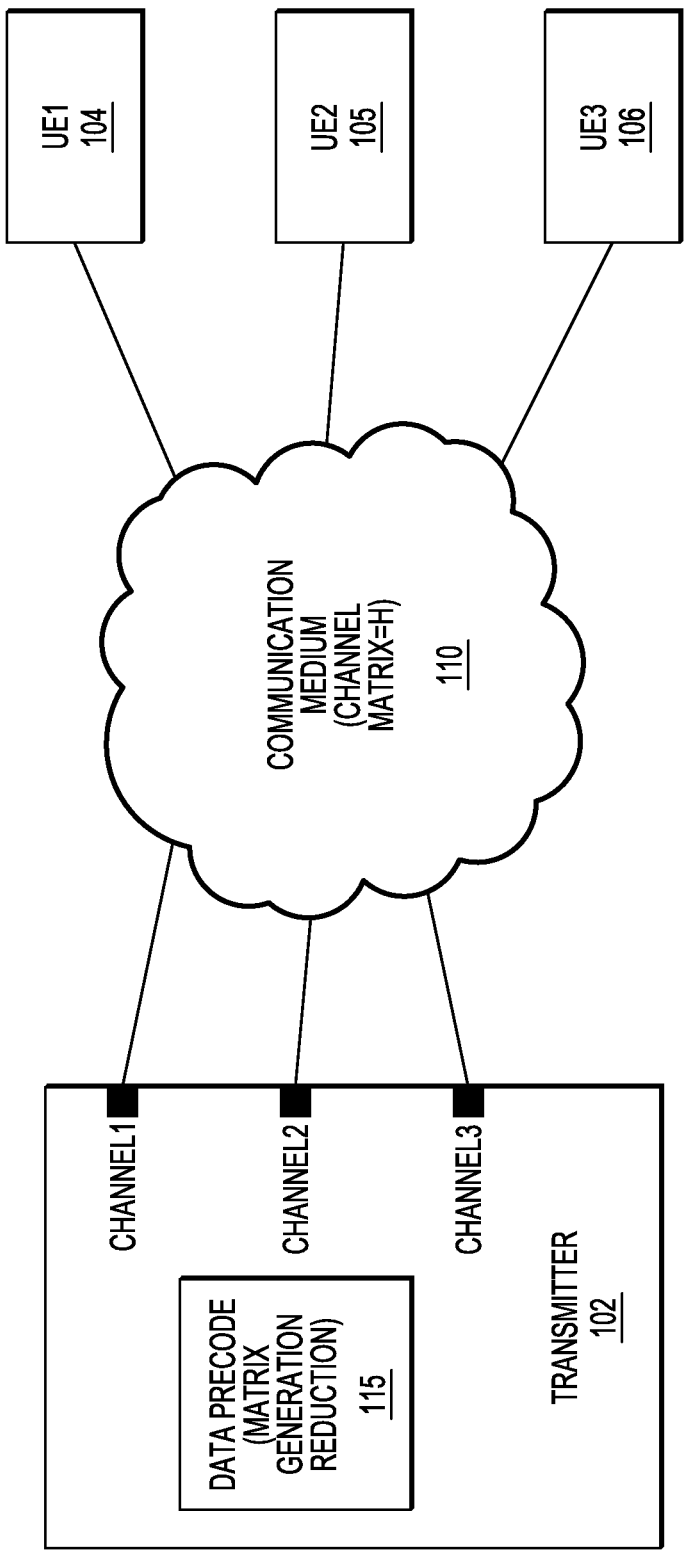
FIG. 1 is a block diagram of a communication network that employs a transmitter configured to reuse, across communication channels, precoding matrices in accordance with at least one embodiment.

FIG. 1 illustrates a block diagram of a portion of a communications network 100 including a transmitter 102, user equipment (UEs) 104, 105, and 106, and a communication medium 110. For purposes of description, it is assumed that the communications network 100 is a telecommunications network, such as a Long-Term Evolution (LTE) wireless communication network or a WiFi network that complies with an 802.11xx network standard. It is further assumed that the transmitter 102 is a multi-user multiple-input multiple output (MU MIMO) transmitter incorporated in or co-located with a base station, such as an Evolved Node B (eNodeB) of an LTE network, and that the UEs 104-106 are each mobile handsets, such as compute-enabled mobile phones. In other embodiments, the transmitter 102 is incorporated or col-located with a wireless router device. However, it will be appreciated that the techniques described herein can apply to different types of transmitters, different types of networks, and different types of user equipment, as well as different combinations thereof. Moreover, it is assumed that that the communication medium 110 is a communication medium that physically transfers of signals between the transmitter 102 and the UEs 104-106, such as air, but that the techniques described herein can apply to different types of communication media.

As indicated above, the transmitter 102 is a MU MIMO transmitter generally configured to receive data from another portion (not shown) of the network, the data representing information individually targeted to different ones of the UEs 104-106. The transmitter 102 negotiates with each of the UEs 104 to 106 to establish user-specific communication channels (referred to herein as channels) with each UE, and communicates data to each of the UEs 104-106 over the corresponding channel and via the communication medium 110. Thus, in the illustrated example, the transmitter 102 establishes three communication channels, designated CHANNEL1, CHANNEL2, and CHANNEL3, to communicate data to UE 104, UE 105, and UE 106, respectively. In at least one embodiment, the transmitter 102 includes a plurality of antennas (not shown at FIG. 1) to send data over the communication medium 110, with each channel including multiple ones of the plurality of antennas. For example, in at least one embodiment each channel includes at least two antennas to communicate data, thereby supporting more reliable communication with the UEs 104-106.

In at least one embodiment, the transmitter 102 is configured to communicate data via the channels concurrently. This concurrent transmission of data via different channels can cause cross-channel interference, reducing the reliability of the communicated data. Further, reduction of the cross-channel interference is based on the state of each communication channel. Therefore, it is difficult to reduce such cross-channel interference at the UEs 104-106 themselves, as each individual UE is not aware of the state of the communication channels corresponding to the other UEs. Accordingly, to reduce cross-channel interference, the transmitter 102 includes a data precode module 115 generally configured to precode the received data for transmission. In particular, the data precode module is configured to adjust the data to be transmitted to account for how the data is likely to be affected by cross channel interference, as well as other characteristics of the communication medium 110.

To illustrate, the data precode module 115 is generally configured to determine a baseline channel matrix, designated channel matrix H, for the communication medium 110. The channel matrix H reflects characteristics of the communication medium 110, including characteristics resulting from cross-channel interference, and in particular the effect of the communication medium 110 on transmitted signals. The data received at the UEs 104-106 is given by the following formula:

$$r = H*x + n$$

where r is the matrix of received data, H is the channel matrix, x is the vector of data being transmitted, and n represents a vector containing a noise samples associated with the communication medium 110.

In at least one embodiment, the data precode module 115 determines the channel matrix H by sending one or more test signals to the UEs 104-106 via each of the communication channels, receiving responsive test information from each of the UEs 104-106, and generating the channel matrix H based on the responsive test information using one or more conventional techniques. In at least one other embodiment, the data precode module 115 estimates the channel matrix H based on stored characteristics of the communication medium. In still another embodiment, the data precode module 115 generates the channel matrix H based on a combination of stored characteristics and test results from transmission of one or more test signals.

For each channel, the data precode module 115 generates a user-specific channel complementary matrix, referred to herein as an individual channel matrix, based on the baseline channel matrix H. In at least one embodiment, the data precode module 115 generates the individual channel matrix. The individual channel matrix (also termed complementary channel matrix) is generated once for each user by removing from the global channel matrix H the columns (or lines, depending on the used model) corresponding to the respective channel.

The individual channel matrix for a channel represent interference paths, indicating how the data targeted to the corresponding UE will interfere with data targeted to the other UEs. Accordingly, for each channel the data precode module 115 performs a matrix decomposition to set these matrix terms to zero. The resulting matrix, when multiplied by the data to be transmitted via the channel, effectively reduces the effects of cross-channel interference on the data, so that the data can be more easily and reliably decoded at the corresponding UE. In particular, the precoding matrix (P) used to precode the data must satisfy the following formula:

$$H_i * P_{j,k} = 0, \ i \neq j$$

where $H_i$ is the individual channel matrix. Accordingly, the precoding matrix P can be generated by selecting P from the null space of the individual channel matrix. In particular, P is selected by performing a decomposition of the individual channel matrix to select the null space.

In at least one embodiment, to perform the matrix decomposition, the data precode module 115 employs a QR decomposition process using a Givens rotation method, wherein it generates a set of rotational matrices, each matrix in the set designated as a matrix T, and multiplies the rotational matrices set together in order to generate a combined matrix, designated Q. The data precode module 115 then multiplies the Q matrix and the individual channel matrix to zero out the interference terms, multiplies the resulting matrix with the data to be transmitted, thereby precoding the data.

Figure 2:
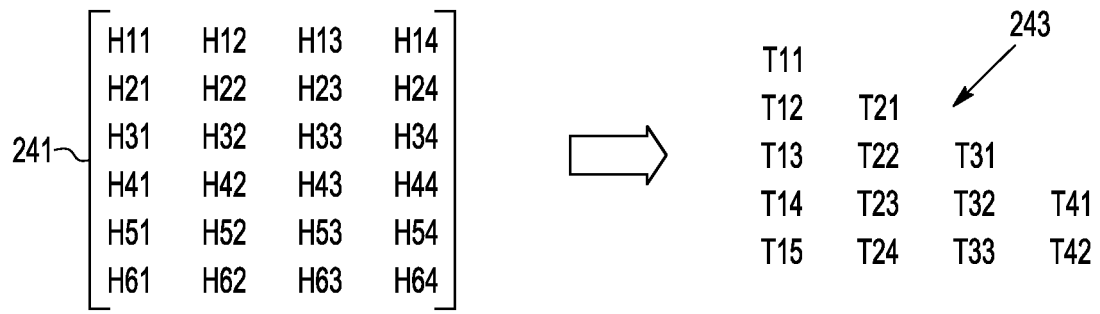
FIG. 2 is a diagram illustrating an example of the transmitter of FIG. 1 reusing precoding matrices across communication channels in accordance with at least one embodiment.
Figure 2:
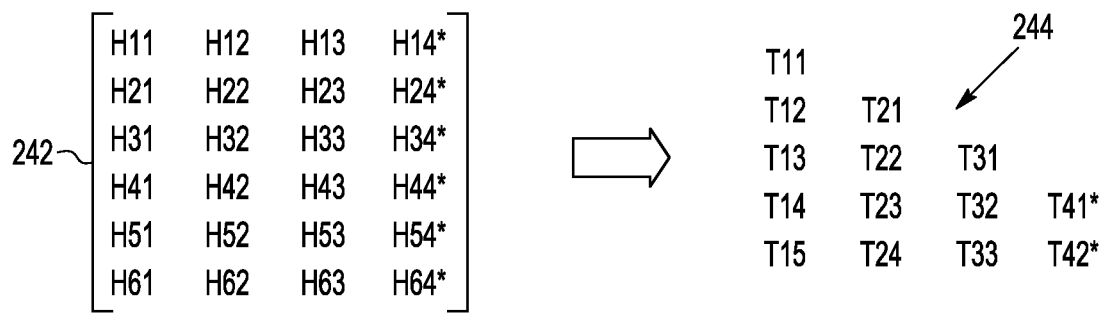
Figure 2:
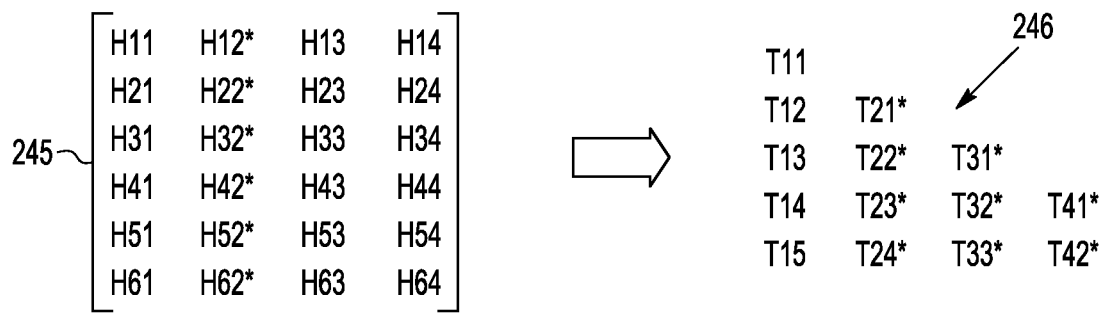

The set of T matrices is generated according to conventional rotational matrix generation techniques. In at least one embodiment, the individual channel matrices for different channels are substantially similar such as, for example, their terms varying only in one column or a few columns. In particular, the channels of the transmitter 102 can be placed in a channel order, according to the order the channels appear in the baseline channel matrix H, such that the channels placed in order of similarity of their individual channel matrices. This results in the T matrix sets for the different channels being substantially similar, with only a relatively small number of matrices differing between channels that are adjacent in the channel order. An example is illustrated at FIG. 2 which depicts individual channel matrix 241 for one channel of the transmitter 102 and individual channel matrices 242 and 245 for different channels of the transmitter 102 in accordance with at least one embodiment. In addition, FIG. 2 illustrates the T matrix sets used for precoding for each channel, wherein T matrix set 243 corresponds to the individual channel matrix 241, T matrix set 244 corresponds to the individual channel matrix 242, and T matrix set 246 corresponds to the individual channel matrix 245.

In the depicted example, the channel matrices 241 and 242 differ only in the last column of the matrices. Accordingly, the T matrix sets 243 and 244 differ only by two T matrices, T41 and T42. Because the remaining matrices in the T matrix sets are the same, the data precode module 115 can reuse the same T matrices for precoding data for different channels, thereby reducing overall computational overhead. Thus, for example, the precode module 115 can generate each matrix in the T matrix set 243 for precoding for the associated channel. For precoding the channel corresponding to the individual channel matrix set 242, the precode module 115 generates the T matrix set 244 by generating only matrices T41* and T42*, and reusing the remaining T matrices from T matrix set 244. The individual channel matrices 242 and 245 differ in the second column, so that the T matrix sets differ by nine T matrices (T21, T22, T23, T24, T31, T32, T33, T41, and T42). Accordingly, for precoding the channel corresponding to the individual channel matrix set 245, the precode module 115 generates the T matrix set 244 by generating matrices T21*, T22*, T23*, T24*, T31*, T32*, T33*, T41*, and T42*, and reusing the remaining T matrices from T matrix set 244.

In at least one embodiment, the number of T matrices that can be reused depends on which column of the individual channel matrices differ. In the example of FIG. 2, because it is the last column (column 4) of the channel matrices 241 and 242 that differ, only the matrices T41 and T42 of the T matrix sets 243 and 244 differ. In contrast, if the terms of column 3 of the channel matrices 241 and 242 differ, the corresponding T matrix sets will differ in both columns 3 and 4 (thus, the matrices T31, T32, T33, T41, and T42 will all differ between the T matrix sets). If the terms of column 2 of the channel matrices 241 and 242 differ, the corresponding T matrix sets will differ in each of columns 2, 3, and 4. Finally, if the terms of column 1 of the channel matrices 241 and 242 differ all the T matrices will differ as well.

Accordingly, in at least one embodiment, the data precode module 115 identifies a channel order for the user-specific channels of the transmitter 102 by selecting an initial user-specific channel at random or based on a specified initial channel. The precode module 115 then orders the remaining channels based on the column where the individual channel matrices differ. Thus, for example, assuming that the transmitter 102 includes six channels, the data precode module 115 selects an initial channel. The data precode module 115 then places next in the channel order the user-specific channel whose individual channel matrix differs from the individual channel matrix of the initial channel in the last column of the matrices. The data precode module 115 then places next in places next in the channel order the channel whose individual channel matrix differs from the individual channel matrix of the initial channel in the second-to-last column of the matrices, and so on until all of the channels have been placed in channel order.

For the initial channel in the channel order, the data precode module 115 generates each of the matrices in the corresponding T matrix set according to a conventional rotational matrix generation technique. This is referred to as the initial T matrix set. For the next channel, the data precode module 115 generates the T matrix set as follows: the precode module 115 generates new T matrices for the T matrices that will differ from the initial T matrix set, as explained above with respect to FIG. 2, and reuses the remaining T matrices from the initial T matrix set. For the next channel in the channel order, the data precode module 115 forms the corresponding T matrix set by again generating new T matrices for the T matrices that will differ from the initial T matrix set 2, and reuses the remaining T matrices from the initial T-matrix set. The data precode module 115 continues through the channel order in similar fashion to generate T matrix sets for each channel, reusing T matrices from the initial T-matrix set to reduce computational overhead. For each channel, the data precode module 115 multiplies the T matrices of the corresponding T matrix set together to generate the Q matrix for the channel, then multiplies the Q matrix, the individual channel matrix for the channel, and the data matrix for the data to be transmitted to generate a precoded set of data. The transmitter 102 then communicates the precoded set of data via the corresponding channel.

In at least one embodiment, the data precode module 115 can further reduce computational overhead by generating a new initial T matrix set in response to reaching a threshold point in the channel order, such as the halfway point of the channel order. To illustrate, in response to reaching the threshold point in the channel order, the data precode module 115 reverses the channel order of the remaining channel. This ensures that once again the first two individual channel matrices in the channel order will differ only in their last column, the next individual channel matrix in the channel order will differ from the first individual channel matrix by the second-to-last column, and so on. Thus, the channel order is re-ordered so that the corresponding T matrix sets will differ by only a subset of their matrices, as described above. Accordingly, after reversing the channel order, the data precode module 115 generates a new initial T matrix set for the first channel in the new channel order, then forms T matrix set for the next channel in the new channel order by generating new T matrices for the T matrices that will differ from the new initial T matrix set, and reuses the remaining T matrices from the new initial T matrix set. Thus, by reversing the channel order after reaching the threshold position in the channel order, the data precode module 115 is able to reuse more T matrices for precoding channel data, thereby further reducing computations at the transmitter 102 to save power and computation overhead.

Figure 3:
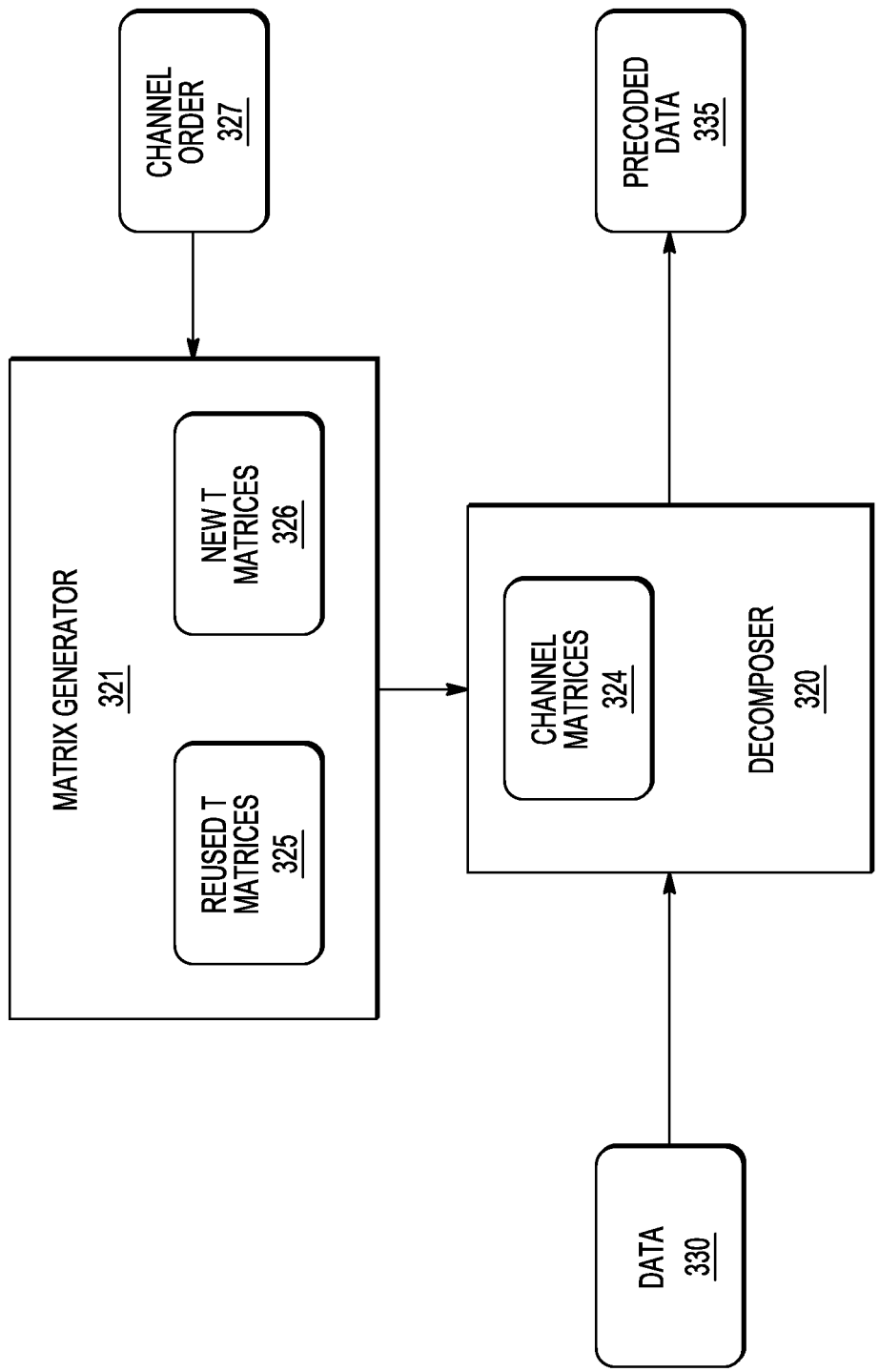
FIG. 3 is a block diagram of the data precode module of FIG. 1 configured to reuse precoding matrices for different communication channels in accordance with at least one embodiment.

FIG. 3 illustrates a block diagram of the precode module 115 in accordance with at least one embodiment. In the illustrated example, the precode module 115 includes a decomposer 320 and a matrix generator 321. The decomposer 320 includes circuitry generally configured to generate individual channel matrices 324 for each channel of the transmitter 102. The decomposer 320 receives data 330 for communication via on of the channels, and decomposes the corresponding channel matrix 324 using a QR decomposition process to generate precoded data 335. In particular, the decomposer 320 decomposes the channel matrix 324 using a set of rotational matrices T generated by the matrix generator 321.

The matrix generator 321 is generally configured to receive a channel order 327 indicating a channel order for the channels of the transmitter 102. In at least one embodiment, the channel order is based on the variation in terms of the channel matrices 324 for each channel, wherein each the channel matrix for each channel in the channel order differs from the channel matrix for the initial channel in the channel order at a different matrix column. The matrix generator 321 then generates a set of T matrices for each channel. The T matrices are generated to have values such that when the T matrices are multiplied together by the decomposer 320 to generate a matrix Q, and the matrix Q is multiplied by the channel matrix corresponding to the initial channel, the terms of the channel matrix corresponding to cross-channel interference are set to zero in the resulting precode matrix. The decomposer 320 then multiplies the precode matrix and the matrix representing the data to be transmitted to generate the precoded data 335 for transmission via the channel.

For the initial channel in the channel order, matrix generator 321 generates the initial T matrix set having entirely new T matrices. This is referred to as the initial T matrix set. For the next channel, the data precode module 115 generates new T matrices 326 for the T matrices that will differ from the initial T matrix set, as explained above with respect to FIG. 2, and reuses T matrices 325 from the initial T matrix set for the remaining matrices of the T matrix set for the channel. The data precode module 115 continues through the channel order in similar fashion to generate T matrix sets for each channel, reusing T matrices from the initial T-matrix set to reduce computational overhead. In at least one embodiment, matrix generator 321 can further reduce computational overhead by generating a new initial T matrix set in response to reaching a threshold point in the channel order, such as the halfway point of the channel order, as described above with respect to FIG. 1.

Figure 4:
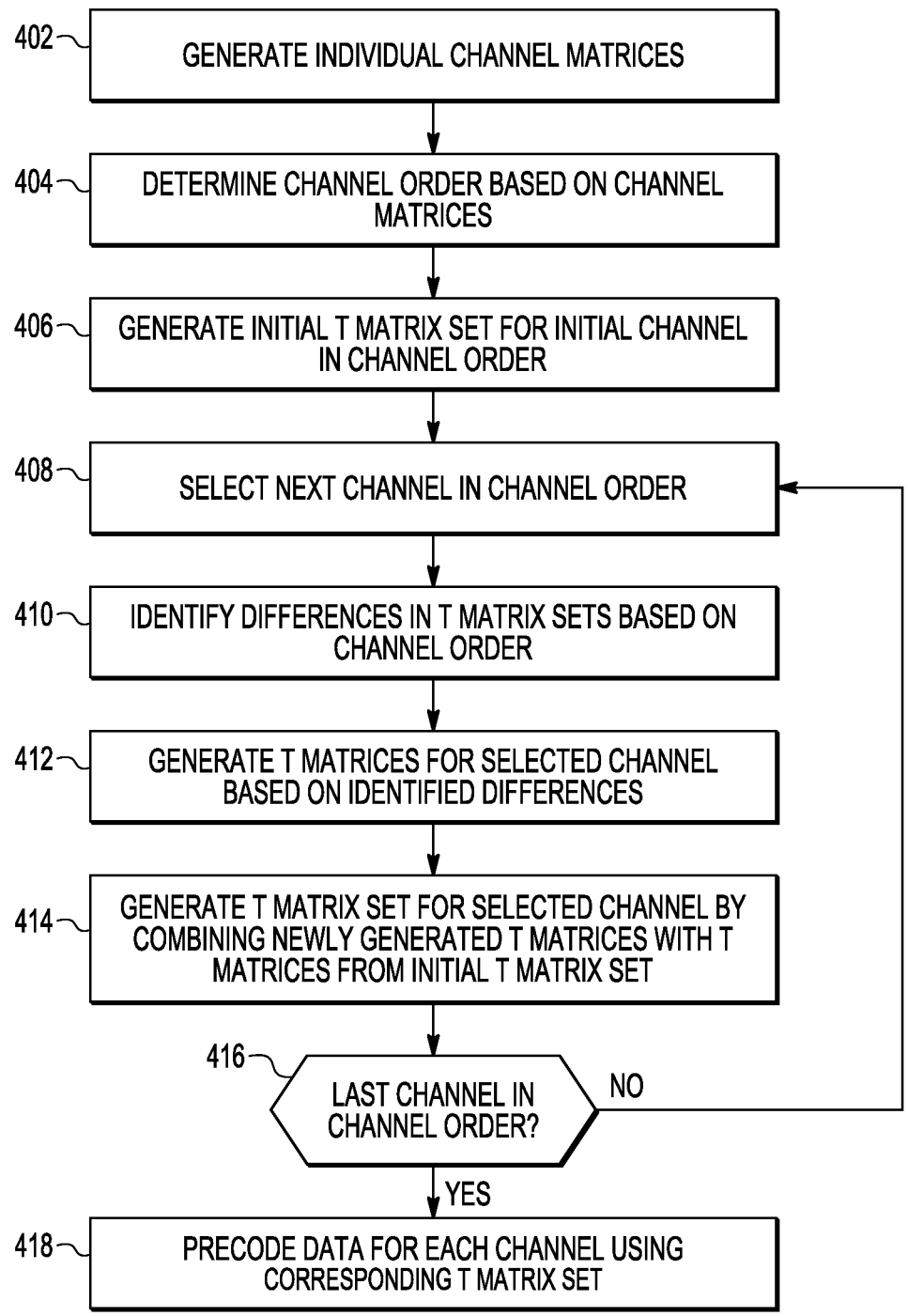
FIG. 4 is a flow diagram of a method of reusing precoding matrices for different communication channels in accordance with at least one embodiment.

FIG. 4 illustrates a flow diagram of a method 400 of reusing precoding matrices for different communication channels in accordance with at least one embodiment. At block 402, the data precode module 115 generates, based on the channel matrix H for the communication medium 110, individual channel matrices for each of the channels of the transmitter 102. At block 404, the data precode module 115 determines a channel order for the channels, based on the locations of variations in values between the individual channel matrices as described above.

At block 406, the data precode module 115 generates an initial set of rotational (T) matrices for the initial channel in the channel order. At block 408 the data precode module 115 selects the next channel in the channel order and, at block 410, identifies differences in the T matrices included in the initial T matrix set and the matrices in the T matrix set for the selected channel. In at least one embodiment, the different T matrices are indicated by the position of the selected channel in the channel order, as described above with respect to FIG. 2. At block 412, the data precode module 115 generates new T matrices for those matrices identified as different at block 410. At block 414, the data precode module 115 generates the T matrix set for the selected channel by combining the new T matrices generated at block 412 with the T matrices from the initial T matrix set that are the same for the selected channel (i.e. that were not identified as different at block 410).

At block 416 the data precode module 415 determines if the selected channel is the last channel in the channel order. If not, the method flow returns to block 408 and the data precode module 115 selects the next block in the channel order. If, at block 416, the data precode module 115 determines that the selected channel is the last channel in the channel order, the method flow moves to block 418 and the data precode module 115 precodes data for each channel using the corresponding T matrix set. In at least one embodiment, the data precode module 115 precodes the data for a channel by multiplying the corresponding T matrices together to generate a matrix Q, then multiplying the matrix Q and the individual channel matrix for the channel. The data to be transmitted is then multiplied by the resulting matrix to generate the precoded data, and the transmitter 102 transmits the precoded data via the associated channel.

Figure 5:
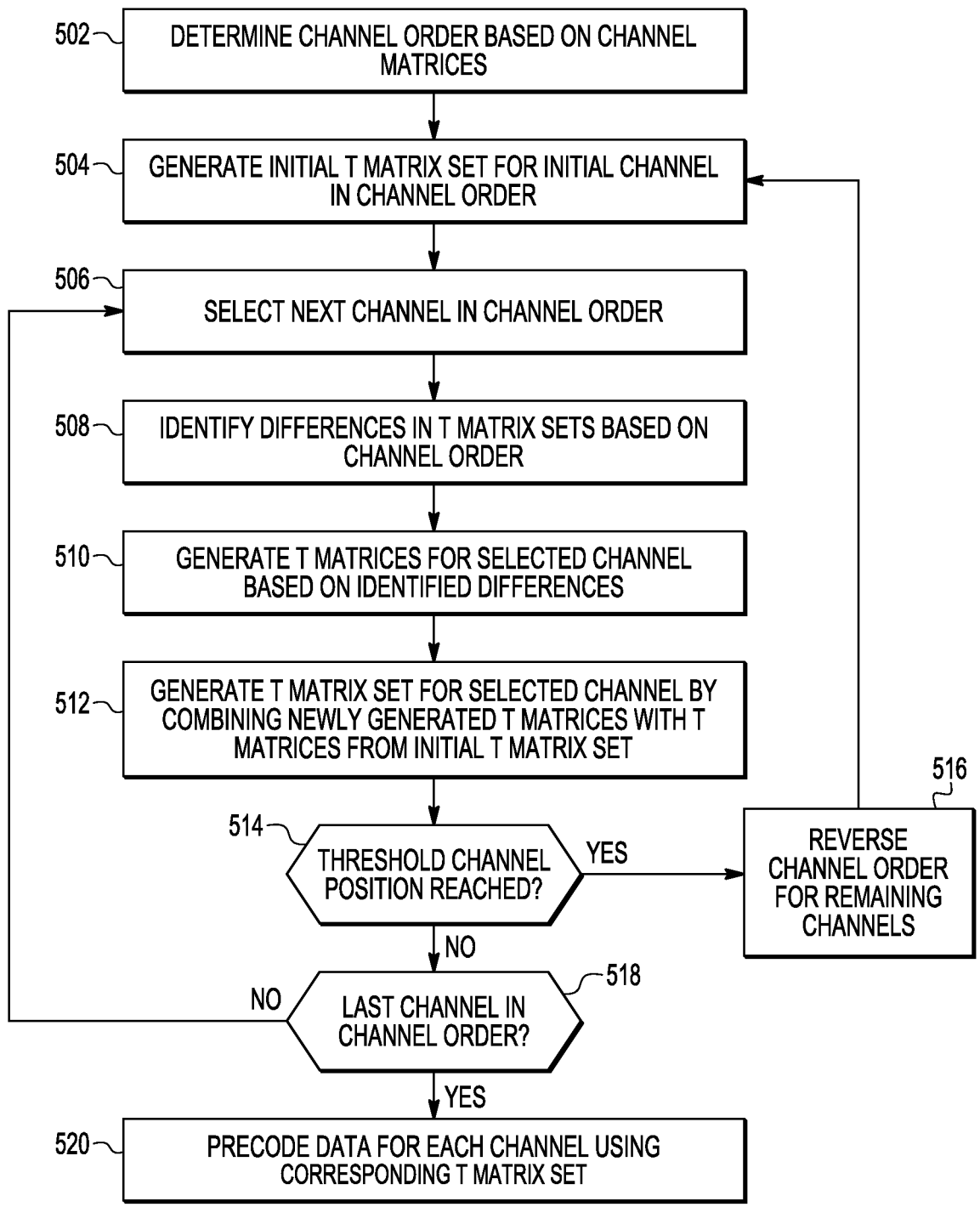
FIG. 5 is a flow diagram of a method of reusing different portions of different precoding matrices for different communication channels in accordance with at least one embodiment.

FIG. 5 is a flow diagram of a method 500 of reusing different portions of different precoding matrices for different communication channels in accordance with at least one embodiment. Prior to block 502, the data precode module 115 generates, based on the channel matrix H for the communication medium 110, individual channel matrices for each of the channels of the transmitter 102. At block 502, the data precode module 115 determines a channel order for the channels, based on the variations in values between the individual channel matrices as described above.

At block 504, the data precode module 115 generates an initial set of rotational (T) matrices for the initial channel in the channel order. At block 506 the data precode module 115 selects the next channel in the channel order and, at block 508, identifies differences in the T matrices included in the initial T matrix set and the matrices in the T matrix set for the selected channel. At block 510, the data precode module 115 generates new T matrices for those matrices identified as different at block 508. At block 512, the data precode module 115 generates the T matrix set for the selected channel by combining the new T matrices generated at block 510 with the T matrices from the initial T matrix set that are the same for the selected channel (i.e. that were not identified as different at block 508).

At block 514, the data precode module 115 determines if the next channel is at a threshold position in the channel order, such as at the halfway position in the channel order. If so the method flow proceeds to block 516 and the data precode module 115 reverses the order of the remaining channels. Thus, the channel at the threshold position becomes the initial channel in the new channel order. The method flow returns to block 504 and the data precode module 115 generates a new initial T matrix set for the new initial channel in the new channel order. The data precode module then proceeds to generate T matrices for the remaining channels in channel order as described above. By reversing the channel order in response to reaching the threshold channel position, the data precode module further reduces the overall number of T matrices generated for data precoding at the transmitter 102.

Returning to block 514, if the next channel in the channel order is not at the threshold channel position, the method flow moves to block 518 and the data precode module 115 determines if the selected channel is the last channel in the channel order. If not, the method flow returns to block 506 and the data precode module 115 selects the next block in the channel order. If, at block 518, the data precode module 115 determines that the selected channel is the last channel in the channel order, the method flow moves to block 520 and the data precode module 115 precodes data for each channel using the corresponding T matrix set.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
    generating, at a transmitter device, a first set of rotational matrices for a set of channels of the transmitter device;
    precoding first data for transmission based on the first set of rotational matrices to generate first precoded data;
    transmitting the first precoded data via a first channel of the set of channels at the transmitter device;
    generating, at the transmitter device, a second set of rotational matrices for the set of channels based on the first set of rotational matrices;
    precoding second data for transmission based on the second set of rotational matrices to generate second precoded data; and
    transmitting the second precoded data via a second channel of the set of channels at the transmitter device.

2. The method of claim 1, wherein generating the second set of rotational matrices comprises using a first subset of the first set of rotational matrices for a corresponding subset of the second set of rotational matrices.

3. The method of claim 1, further comprising:
    generating, at the transmitter device, a third set of rotational matrices for the set of channels based on the first set of rotational matrices;
    precoding third data for transmission based on the third set of rotational matrices to generate third precoded data; and
    transmitting the third precoded data via a third channel of the set of channels at the transmitter device.

4. The method of claim 1, further comprising:
    identifying a channel order for the set of channels of the transmitter device based on a set of network characteristics; and
    generating the second set of rotational matrices based on the first set of rotational matrices in response to identifying a proximity of the first channel to the second channel in the channel order.

5. The method of claim 1, further comprising:
    generating a third set of rotational matrices at the transmitter device independent of the first set of rotational matrices;
    precoding third data for transmission based on the third set of rotational matrices to generate a third precoded data;
    concurrent with transmitting the first precoded data, transmitting the third precoded data via a third channel of the set of channels at the transmitter device;
    generating, at the transmitter device, a fourth set of rotational matrices based on the third set of rotational matrices;
    precoding fourth data for transmission based on the fourth set of rotational matrices to generate fourth precoded data; and
    transmitting the fourth precoded data via a fourth channel of the set of channels at the transmitter device.

6. The method of claim 2, wherein generating the second set of rotational matrices comprises using a plurality of matrices of the first set of rotational matrices for corresponding matrices of the second set of rotational matrices.

7. The method of claim 3, wherein:
    generating the second set of rotational matrices comprises using a first plurality of matrices of the first set of rotational matrices for matrices of the second set of rotational matrices; and
    generating the third set of rotational matrices comprises using a second plurality of rotational matrices of the first set of rotational matrices for corresponding matrices of the third set of rotational matrices, the second plurality of rotational matrices different from the first set of rotational matrices.

8. A method, comprising:
    identifying at a transmitter device a channel order for a plurality of channels of the transmitter device;
    generating for a first channel of the plurality of channels a first set of rotational matrices;
    precoding first data for transmission based on the first set of rotational matrices to generate first precoded data;
    transmitting the first precoded data via the first channel;
    in response to identifying a second channel of the plurality of channels based on a proximity of the second channel to the first channel in the channel order:
        generating for the second channel a second set of rotational matrices based on the first set of rotational matrices;
        precoding second data for transmission based on the second set of rotational matrices to generate second precoded data; and
        transmitting the second precoded data via the second channel at the transmitter device.

9. The method of claim 8, wherein the first channel is an initial channel in the channel order, and the second channel immediately follows the first channel in the channel order.

10. The method of claim 8, further comprising:
    in response to identifying a third channel is at a threshold position in the channel order:
        modifying the channel order to generate a modified channel order;
        generating, for an initial channel of the plurality of channels in the modified channel order, a third set of rotational matrices independent of the first set of rotational matrices; and
        precoding third data for transmission based on the third set of rotational matrices to generate third precoded data.

11. The method of claim 9, further comprising:
in response to identifying a third channel of the plurality of channels based on a proximity of the third channel to the first channel in the channel order:
generating for the third channel a third set of rotational matrices based on the first set of rotational matrices;
precoding third data for transmission based on the third set of rotational matrices to generate third precoded data; and
transmitting the third precoded data via the second channel at the transmitter device.

12. The method of claim 10, further comprising:
in response to identifying a fourth channel of the plurality of channels based on a proximity of the fourth channel to the initial channel in the modified channel order:
generating for the fourth channel a third set of rotational matrices based on the third set of rotational matrices; and
precoding fourth data for transmission based on the third set of rotational matrices to generate third precoded data.

13. The method of claim 11, wherein the third channel immediately follows the second channel in the channel order.

14. The method of claim 12, wherein modifying the channel order comprises reversing the channel order.

15. A transmitter, comprising:
a plurality of channels including a first channel and a second channel;
a data precode module configured to:
generate a first set of rotational matrices for the first channel;
precode first data for transmission based on the first set of rotational matrices to generate first precoded data;
transmit the precoded data via the first channel;
generate a second set of rotational matrices based on the first set of rotational matrices;
precode second data for transmission based on the second set of rotational matrices to generate second precoded data; and
transmit the second precoded data via the second channel.

16. The transmitter of claim 15, wherein the data precode module is to generate the second set of rotational matrices by using a first subset of the first set of rotational matrices for a corresponding subset of the second set of rotational matrices.

17. The transmitter of claim 15, wherein the data precode module is configured to:
generate a third set of rotational matrices based on the first set of rotational matrices;
precode third data for transmission based on the third set of rotational matrices to generate third precoded data; and
transmit the third precoded data via a third channel.

18. The transmitter of claim 15, wherein the data precode module is configured to:
identify a channel order for a plurality of channels of the transmitter based on a set of network characteristics; and
generate the second set of rotational matrices based on the first set of rotational matrices in response to identifying a proximity of the first channel to the second channel in the channel order.

19. The transmitter of claim 16, wherein generating second rotational matrix comprises using a plurality of matrices of the first set of rotational matrices for corresponding matrices of the second set of rotational matrices.

20. The transmitter of claim 17, wherein:
the data precode module is configured to generate the second set of rotational matrices by using a first plurality of matrices of the first set of rotational matrices for matrices of the second set of rotational matrices; and
the data precode module is configured to generate the third set of rotational matrices comprises by using a second plurality of rotational matrices of the first set of rotational matrices for corresponding matrices of the third set of rotational matrices, the second plurality of rotational matrices different from the first set of rotational matrices.

* * * * *